Dec. 9, 1924.
M. C. OSTER
TIME COMPUTING DEVICE
Filed June 5, 1922    4 Sheets-Sheet 3
Fig. 3.
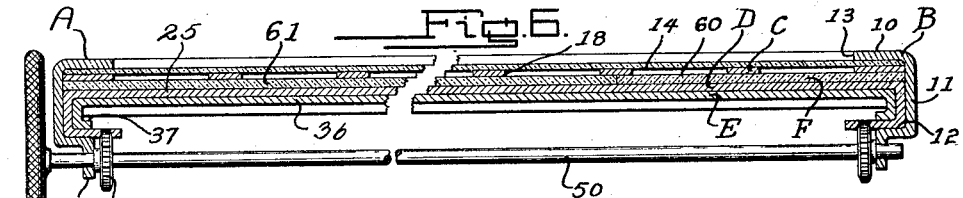
Fig. 6.
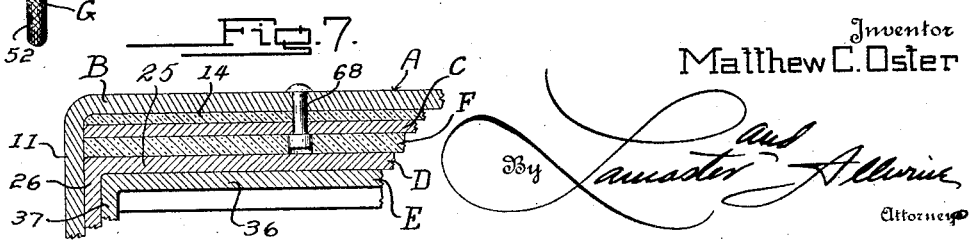
Fig. 7.
Inventor
Matthew C. Oster
By Lancaster & Allwine
Attorneys Dec. 9, 1924.  
M. C. OSTER  
1,518,547

TIME COMPUTING DEVICE

Filed June 5, 1922     4 Sheets-Sheet 4

Inventor  
Matthew C. Oster  
By Lancaster  
Attorneys

Patented Dec. 9, 1924.

1,518,547

UNITED STATES PATENT OFFICE.

MATTHEW C. OSTER, OF ROY, MONTANA.

TIME-COMPUTING DEVICE.

Application filed June 5, 1922. Serial No. 565,853.

*To all whom it may concern:*

Be it known that I, MATTHEW C. OSTER, a citizen of the United States, residing at Roy, in the county of Fergus and State of Montana, have invented certain new and useful Improvements in Time-Computing Devices, of which the following is a specification.

This invention relates to computing devices, and the primary object of the invention is the provision of a novel device for indicating the lapse of time in days and months from any given date to another, thereby providing a device particularly adaptable for use in banking or similar houses for quickly computing the lapse of time from one date to another to find the amount of interest due on notes and the like.

Another object of the invention is the provision of a time computing table, embodying movable dials having stamped or otherwise formed thereon cooperating tables, which will indicate when correctly manipulated the length of time in months and days between any two dates.

A further object of the invention is the provision of a novel means for arranging the dials in relation to each other, and a novel means for shifting the dials so that the same can be easily and quickly manipulated.

A further object of the invention is to provide a novel time computing table embodying means whereby the length of time from a given date to any date in advance of the given date, or from a given date to any past date can be readily computed, thereby permitting the improved device to be used for finding the length of time from the day a note is made out to the maturity date thereof and the length of time between the date when a note is presented for payment and when the note was made out.

A further object of the invention is the provision of a novel movable Sunday mask associated with the time computing device for indicating all of the Sundays of a year, so that a person making out a note can see if the maturity date of the note falls on a Sunday, so as to permit the note to be made out a day in advance if the note would mature on a Sunday.

A still further object of the invention is the provision of a novel time computing device for banks and the like of the above character, which will be durable and efficient in use, one that will be simple and easy to manufacture, and one which can be placed upon the market at a reasonable cost and have an ordinary year calendar associated therewith.

With these and other objects in view, the invention consists in the novel construction, arrangement and formation of parts as will be hereinafter more specifically described, claimed and illustrated in the accompanying drawings, forming a part of this specification.

Figure 3 is an elevation of the day dial.

Figure 4 is a detail elevation of the month dial.

Figure 6 is a horizontal section through the improved time computing device, illustrating one method of actuating the dials.

Figure 7 is an enlarged fragmentary horizontal section through the time computing device, illustrating the means for movably associating the Sunday mask therewith.

Figure 8 is a fragmentary longitudinal section through the improved time computing device.

Figure 9 is a fragmentary detail perspective view of the day dial showing the rack bars formed thereon for facilitating the sliding movement thereof.

Figure 1:
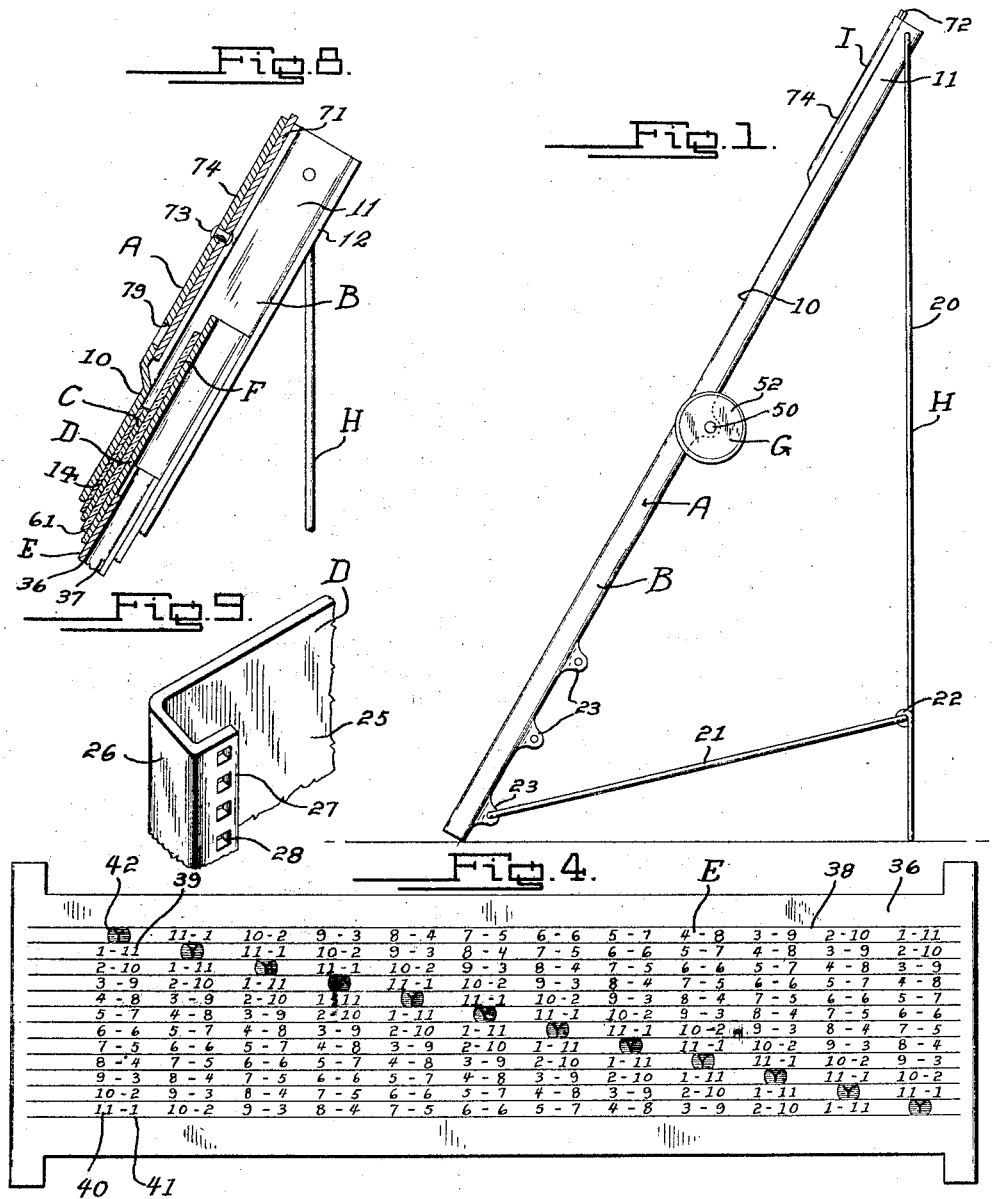
Figure 1 is an edge or side elevation of the improved time computing device, showing the same in the form of an easel.

Referring to the drawings in detail, wherein similar reference characters designate corresponding parts throughout the several views, the letter A generally indicates the improved time computing device, which includes the frame B; the face dial C; the day dial D; the month dial E; the Sunday mask F; and the actuating means G for the day dial.

The frame B is preferably formed of sheet metal of the desired gauge, but the same, of course, can be made of any preferred material. This frame includes a front plate 10 and inwardly extending side flanges 11, which form guides for a purpose which will hereinafter more fully appear. The rear edges of the flanges 11 are provided with inwardly extending flanges 12 which are disposed in parallel relation to the front plate 10 in order to form a more effective guide, which, as stated, will be hereinafter more fully apparent. The front plate 10 has formed therein, at a point intermediate its terminals, the relatively large sight opening 13 as can be clearly seen in Figure 2 of the drawings.

The dials C, D, and E and the Sunday mask F are adapted to be seen through this opening 13 and if desired, a suitable transparent protector 14 can be disposed in front of the dials to prevent the settling of dust, dirt or the like, upon the dials.

This guard 14 is preferably made of transparent celluloid and can be secured in place in any preferred manner.

The face dial C is disposed in rear of the plate 10 in such a manner that the complete dial can be seen through the sight opening 13 and this dial also can be rigidly secured to the frame in any preferred manner. In some instances, it may be desirable to form the face dial as an integral part of the frame or plate 10 and in this instance, of course, the sight opening 13 is eliminated, as well as the transparent guard 14.

The face plate C can be made of any desired material, such as celluloid, cardboard, metal or the like, and has printed or arranged thereon in any preferred manner a plurality of spaced vertical rows of numbers 15, which represent the days of the months, and it can be seen that these numbers are arranged in columns, starting with 1 and ending with 30. Arranged at the head of each column or row 15 is written the month which the days represent as indicated by the reference character 16. It can be seen that the names of the months are arranged in correct calendar order, that is, starting with January and ending with December and are disposed transversely across the face dial. Directly below the columns of figures 15, representing the days of the months of the year having thirty-one days, the numeral 31 may be placed as indicated by the reference character 17. If also desired, the legal holidays of the year may be marked in some distinctive fashion on the face dial so that if the maturity dates fall on a legal holiday, the notes can be made out a day ahead. Disposed intermediate each row or column 15 is a relatively wide slot 18, behind which the day dial D and the month dial E are adapted to appear as will be hereinafter more fully described.

The frame B can of course, be supported, in any suitable manner, such as by an easel H and this easel H will permit the device to be held in proper position on a desk or other support. The easel supporting structure H, as shown includes legs 20 pivotally secured at their upper ends to the upper ends of the flanges 11 formed on the plate 10. The legs 20 are held against accidental movement in relation to the plate 10 by means of brace arms 21 which can be pivotally secured as at 22 to the legs 20 and these legs are adapted to hook into or otherwise engage any pair of the plurality of pairs of apertured ears 23 formed on the flanges 12 forming a part of the frame B.

The day dial D is disposed directly in rear of the face dial C and consists of a flat plate 25 formed of any desired material, such as metal or the like, and this plate has its longitudinal edges bent back rearwardly to provide a guide track 26 and inwardly extending flat flanges 27. The guide tracks 26 are of the same configuration as the guard tracks defined by the flanges 11 and 12 of the frame B and are adapted to snugly fit within the same as clearly shown in Figures 6 and 7 of the drawings. The flanges 27 are provided with openings arranged at equi-distantly spaced points to form rack bars 28, which form a part of the operating mechanism G which will be later described.

The dial D has arranged centrally therein and transversely thereof a slot 29 which is adapted to appear in rear of the slots 18 formed in the face dial C. The slot 29 is provided to permit the months dial E to be seen through the plate and the slots 18 and 29 cooperate to permit the finding of the length of time between any two dates which will be later described. The day dial D has arranged thereon a plurality of vertically disposed rows of numerals 30 and 31 disposed on opposite sides of the slot 29 and these rows of numerals are arranged in spaced relation as can be clearly seen by referring to Figure 3 of the drawings. Each of the rows 30 and 31 include two vertically aligned columns of figures 32 and 33 and these columns of numerals represent the number of days in a month. The numerals in the column 32 are used to find the length of time from a given date or present date to a past date, while the numerals in the column 33 are utilized to find the length of time from a given or present date to any given future date, and these columns 33 are utilized when it is desired to find the maturity dates of notes or the like when the same are being made out. The columns of numerals 32 in the rows 30 start with 1 and terminate with 29, while the columns 32 in the rows 31 start with 29 and end with 1. The columns 33 in the rows 31 are arranged directly opposite and it can be seen that the numerals in the columns 33 of the rows 30 start with 29 from the slot 29 and end with 1, while the numerals in the column 33 in the rows 31 start with 1 from the slot 29 and terminate in 29. The numerals constituting the columns 32 and 33 of the rows 30 and 31 may, if desired, be divided by transverse lines 34 which facilitate the reading of the time computing device.

The month dial E is disposed directly in rear of the day dial D and includes a plate 36 which also can be formed of metal if so desired, and this plate 36 has its longitudinal edges bent rearwardly to provide angular guide tracks or flanges 37. These angular guide tracks or flanges 37 are disposed within the tracks 26 of the day dial D and conform to the configuration thereof. These tracks or flanges 37 are adapted to frictionally engage the tracks 26 and thus this dial E is held in any adjusted position by the friction set up between the flanges or tracks 37 and 26. The month dial E has arranged thereon a plurality of equi-distantly spaced transverse lines 38. A plurality of rows of numerals 39 are arranged on the plate 36 in any preferred manner and each row constitutes a pair of columns of figures 40 and 41. As shown, there are twelve rows of the pairs of columns 40 and 41 and a pair of the columns for each month of the year, and each of the numerals in the columns 40 and 41 represent a month. At the upper end of the first row 39 is arranged a distinctive colored spot 42 with the letter "Y" printed therein indicating a year and this year mark is arranged at the left hand end of the horizontally aligned row of numerals which can be clearly seen by referring to Figure 4 of the drawings. It is to be understood of course, that each row 39 has a year spot 42 arranged therein, and this year spot 42 is preferably colored blue, while the columns 32 in the rows 30 and 31 are preferably colored red and the columns 33 of the rows 30 and 31 are preferably colored black. As clearly stated, the distinctive colored year spot 42 is disposed at the upper end of the first column 39 or in the first space defined by the transverse line 38 and the spot 42 in the second row 39 is disposed in the second space defined by the transverse lines 38 and in the third column is a third space, etc. Thus these spots 42 are disposed in a diagonal line extending from the top of the dial at the left hand side thereof and ending at the bottom of the dial in the last row 39 at the right hand side of the dial. The numerals 40 of the row 39 increase in valuation below the year spots 42 and decrease in valuation above the year spots, while the numerals in the columns 41 of the rows 39 decrease in valuation below the year spots 42 and increase in valuation above the year spots. The columns 40 of the rows 39 are preferably colored red, and the columns 41 of the row 39 are preferably colored black. All of the columns 40 and 41 and all of the rows 39 contain numerals 1 to 11 representing the numerals of the month of the year and of course the spots 42 represent the year itself.

Figure 2:
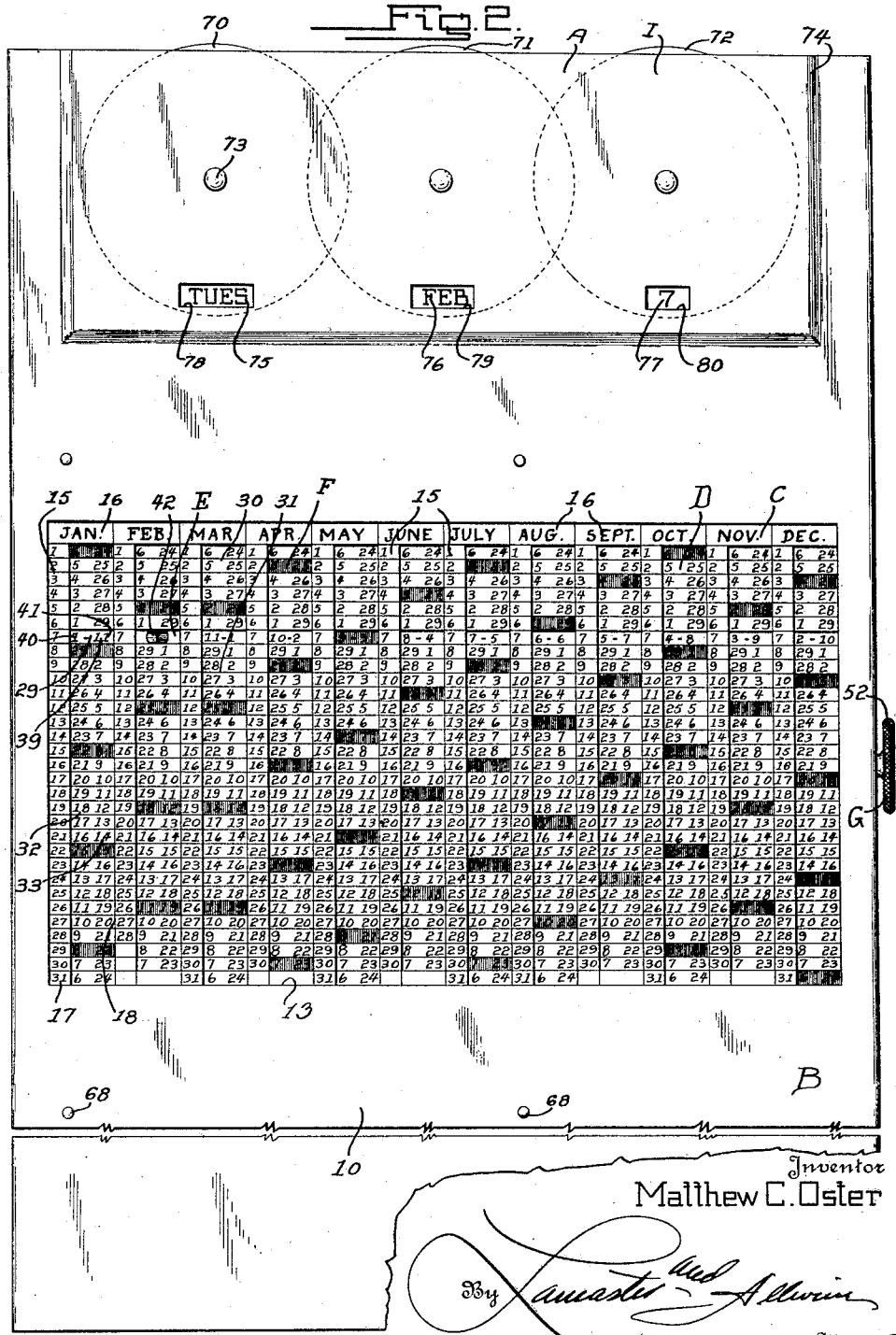
Figure 2 is a front elevation of the improved time computing device.

In using the improved device, the year spots 42 are adapted to appear directly in rear of the slot 29 as shown in Figure 2 of the drawings.

In operation of the improved time computing device, when it is desired to find the space of time between any two dates, the dial D is first adjusted in relation to the dial C according to the given date, after which the dial E is adjusted in relation to the dial C according to the given date.

Thus, if it is desired to find the length of time elapsed between say, a note dated October 15, 1921, and due Feb. 20, 1922, the dial E is moved in rear of the dial D until the year spot in the second vertical row 39 appears in the rear of the slot 29 in the second slot 18 of the face dial C, that is in the slot for the month of February. The dials D and E are then moved until the slot 29 comes into alignment with the numeral 20 in the column 15 representing the month of February. Now it is merely necessary to glance at the month of October and the numeral 4 will appear in the slot 29 opposite the numeral 20 of the column 15 representing the month of October, which indicates the number of months and by glancing at the numeral 15 which is the day the note was made out in the column 15 of the month of October, the numeral 5 will be found in the column 32 of the row 30 and thus indicating that five days have elapsed and that the full length of time is four months and five days. Now, if the note was dated October 28 and was due February 20, the dial E is moved in the same manner to position the blue spot in the February column opposite the numeral 20 the day the note was due and the number of months elapsed is found in the slot 29 in the October column and to find the number of days, the person computing the time would look down to October 28 in the column 15 which will show the numeral 22 in the column 32 of the row 31 thus indicating that 22 days have elapsed. Now, when, the number of days elapsed falls below the slot 29 or in the columns 32, of the rows 31, it is necessary to subtract one month from the total number of months shown and thus the length of time elapsed in the given example will be three months and twenty-two days. In all instances, where it is necessary to look below the slot 29 for the number of days to find the length of time from the present time to any past time, one month is subtracted from the number of months appearing in rear of the slot 25. In case a note is presented for payment in less than a month's time from when it is dated, the blue spot indicating the year will appear in the column which should show the number of months, thus indicating that no months have elapsed. The time computing device does not take into consideration the fact that some months include thirty-one days, and thus if it is desired to include these days, it is merely necessary to look at the dial C in order to see the month having thirty-one days which is shown by the reference character 17 and these days are added to the total number of days found.

In actual practice, the month dial will be moved so that one of the distinctive year spots 42 will appear in the current month, and then the dial D will be advanced each morning for the actual date, and when a note is presented for payment, it is merely necessary to glance at the date that the note was made out or dated.

To find the length of time from the current date to any future date, so as to permit the exact length of time to be found from when a note is to be made out to its maturity, the dials D and E are operated in the same manner, and it is only necessary to look at the black numerals appearing on the dials D and E instead of the red numbers. Thus, suppose the present date is February 20 and a person coming in desires to have a note made out to July 22. Now to find the length of time elapsing from February 20 to July 22, the dial E is slid until the year spot 42 comes into alignment with the slot 29, after which the dial D is actuated until this slot comes into alignment with the numeral 20 in the column 15 under the month of February. Now, it is merely necessary to look to the month of July and the slot 29 in alignment with the numeral 20 in the column 15 under the month of July in the column 41 and will be found the black number 5 indicating that 5 months have elapsed while to find the number of days elapsed it is merely necessary to look opposite the number 22 in the column 15 of the month of July in the column 32 of the row 31 and the black numeral 2 will be found, indicating that two days have elapsed making a total of five months and two days.

If the maturity date of the note was July 19 instead of the 22nd, it would be necessary to look above the slot 29 to the numeral 19 in the column 15 which will show 29 days. Now, in finding the length of time from a present date to the maturity date of the note being made out, it is necessary to deduct one month from the number of months shown when the day of month comes above the slot 29 and thus the length of time elapsed would read 4 months and 29 days.

If desired, two rows of figures may be used instead of the one row, so that the upper row of figures would indicate the number of months above opening 29 and the lower row of figures would indicate the months below opening 29.

Any means may be provided for actuating the dials D and E and the means G has been merely shown by way of example, and this means includes a transverse shaft 50. This shaft 50 can be journalled in ears 51 carried by the guide tracks or flanges 12, and a suitable thumb wheel 52 can be keyed or otherwise secured on one end of the shaft. Pinions 53 are keyed or otherwise secured to the shaft 50 and engage the rack bars 28 and it is obvious that when the thumb wheel 52 is turned, the dial D will be shifted, carrying the dial E therewith. The dial E is adapted to be shifted manually by the hands of the user, and it is merely necessary to place the fingers in rear of the device, and in engagement the dial E and push the same up or down as the case may be.

Figure 5:
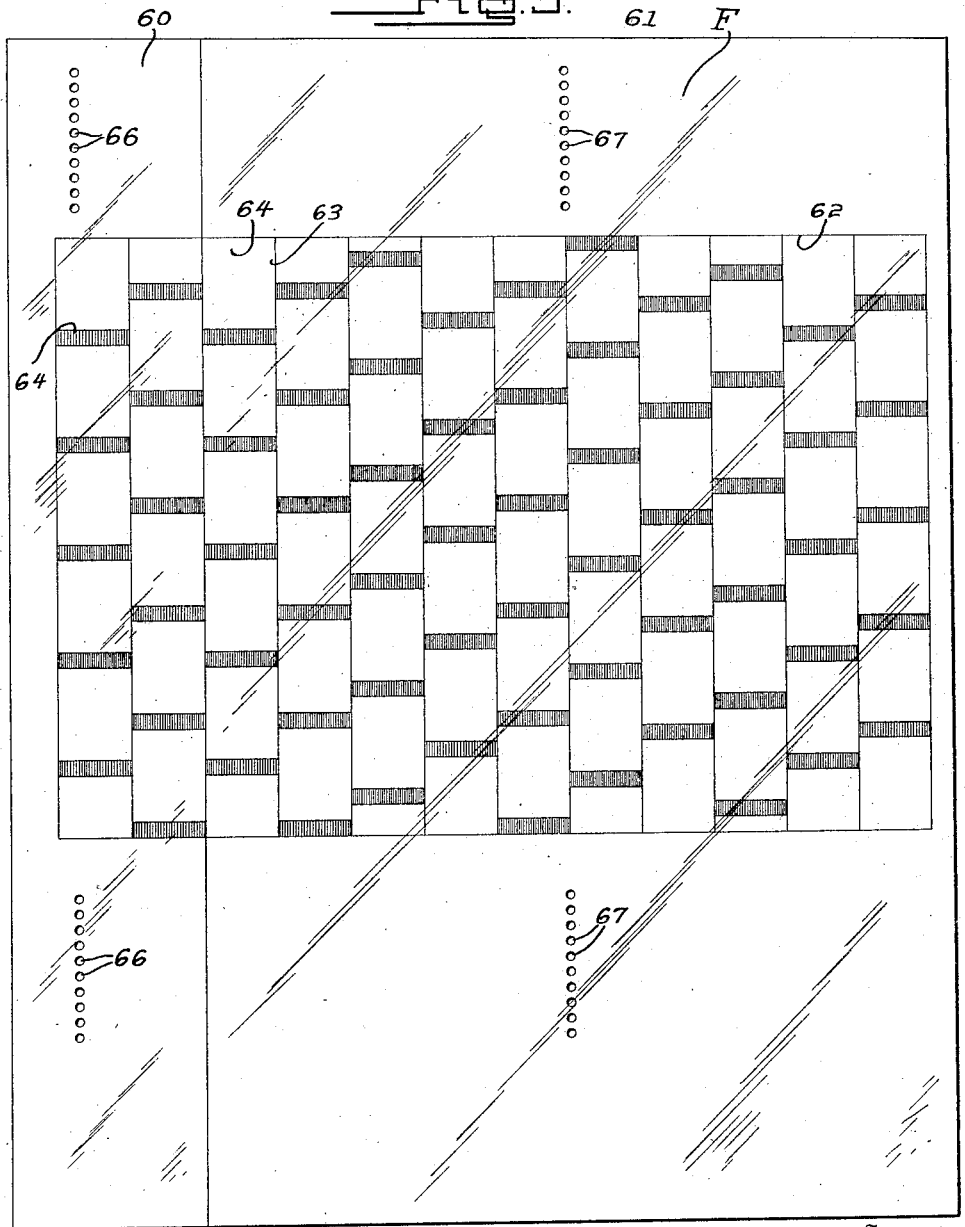
Figure 5 is an elevation of the improved Sunday mask for use with the dial.

In order to effectively show the dates on which Sunday falls, the Sunday mask F has been provided. This mask can be made in any desired way, but it is preferred to make the same of transparent celluloid and as shown includes a relatively narrow plate 60 and a relatively broad plate 61. The plate 60 is for the months of January and February, while the plate 61 is for the other months of the year. The plates 60 and 61 are of course, placed together as shown in Figure 5 of the drawings, and ruled to define a rectangular space 62 which is substantially equal to the sight opening 13. Now, vertical lines 63 are also marked to indicate the vertically disposed spaces 64 for the months of the year. Each column 64 has marked thereon transverse bars 64, which are spaced apart a distance equal to seven of the spaces defined by the transverse lines 34. These bars 64 are equal to one space between a pair of the lines 34 and are preferably colored red so that the same can be readily seen. However, the coloring can be relatively light so that the numerals of the dials can be seen therethrough. Now, the plates 60 and 61 are set at the beginning of each year by the aid of an ordinary calendar so that the red bars 64 will overlie the dates on which Sundays will fall, thus a person making a note out can readily see on which dates Sunday falls, so that the maturity date of a note can be made out so as not to fall on Sunday. The mask is made in two sections or plates 60 and 61 in order that the variance caused by leap year can be taken care of. The mark F is of course, slidably associated with the frame B and these sections 60 and 61 can be provided with vertical rows of equi-distantly spaced openings 66 and 67. Now, the plate 10 of the frame B has relatively short outstanding pins 58 secured thereto which are adapted to be placed in any one of the openings in the rows of openings 66 and 67. These pins 68 also form means for holding the transparent plate 14 and the face dial C in position.

If so desired, a calendar I may be associated with the improved time computing device, and this calendar is shown, by way of example, to consist of three discs 70, 71 and 72, rotatably mounted upon pivot pins 73 carried by the plate 10. If desired, the plate 10 can be struck out as at 74 to accommodate these discs, and the upper edges of the discs are adapted to extend beyond the upper edge of the plate 10 so that the same can be readily turned manually. The disc 70 has printed or otherwise formed thereon the names of the days of the week as indicated by the reference character 75, while the central disc 71 has formed or printed thereon the days of the month of the year as indicated by the reference character 76, while the disc 72 can in turn have printed thereon numerals representing the days of the month as indicated by the reference character 77. Thus, if the day is Tuesday, the dial 70 is turned, until the word "Tuesday" appears in rear of a slot 78 formed in the plate 10 and if the month is February, the disc 71 is turned, until the word "February" appears in rear of the slot 64 cut out in the plate 10, and if the day of the month is the 7th, the dial 72 is turned until the numeral 7 appears in rear of the slot 80 formed in the plate 10.

From the foregoing description, it can be seen that an improved apparatus has been provided by which the lapse of time between any two dates, either in advance of or past a given date in days and months can be accurately determined.

Changes in details may be made without departing from the spirit or scope of this invention; but,

I claim:

1. A time computing device comprising a face dial having vertical rows of numerals arranged thereon in consecutive order representing the days of the months, the face dial having slots therein disposed between the rows of numerals, a day dial having rows of numerals thereon movable in rear of the face dial in rear of said slots, the face dial having a transverse slot arranged to appear in rear of the mentioned slots, and a month dial having numerals disposed thereon arranged to appear in rear of the transverse slot, the month dial being movable in relation to the day dial.

2. In a time computing device, a face dial having a plurality of vertical disposed rows of numerals arranged consecutively and having the names of the months above the rows of numerals, the face dial having vertically disposed slots arranged between the rows of numbers, a day dial slidably mounted in rear of the face dial having a transverse slot therein adapted to appear in rear of the vertical slots in the face plate, the day dial having rows of numerals disposed thereon on opposite sides of the transverse line of openings, the numerals increasing in valuation on one side of the openings and decreasing in valuation on the other side of the openings, and a month dial slidably mounted in rear of the day dial having characters arranged thereon representing the days of the month adapted to appear in rear of the transverse slot formed in the day dial.

3. A time calculator comprising a face dial having rows of numbers representing the days of the month arranged in vertical columns thereon, the face dial having vertical slots formed therein intermediate the rows of numerals, a day dial slidably mounted in rear of the face dial having vertical rows of numerals arranged thereon adapted to appear in rear of the vertical slots, the rows of numerals representing the days of the months and a third dial arranged for sliding movement in relation to the face dial and the day dial including numerals representing the months of the year, the day dial having a transverse slot therein in rear of which the numerals representing the months of the year are adapted to appear.

4. In a time calculator, a face dial having twelve rows of numerals thereon representing the days of the months for each month of the year, the names of the months being disposed above the rows of numerals, a sliding day dial disposed in rear of the face dial, the face dial having longitudinally extending slots formed therein intermediate the rows of numerals, a second or day dial having a transverse slot therein, longitudinal rows of numerals representing the days of the months arranged on each side of the transverse slot, the rows of numerals on one side of the transverse slot increasing in value and the rows of numbers on the opposite side of the transverse slot decreasing in value, and a third dial slidably carried by the second or day dial having a plurality of rows of numerals thereon representing the month of the year adapted to appear in rear of the transverse slot formed in the second dial.

5. In a time calculator, a face dial having a plurality of longitudinally extending rows of numerals representing the days of the months of the year, the names of the months being arranged at the head of each row of numerals, the face dial having slots formed between the rows of numerals representing the months, a day dial having a transverse slot therein arranged to appear in rear of the mentioned slots, a plurality of longitudinally extending rows of numerals representing the days of the months formed on the day dial and arranged to appear between the rows of numerals formed on the face dial, and a month dial having a plurality of rows of numerals representing the months of the year arranged to appear in rear of the slot formed in the day dial.

6. In a time computing device, a face dial having a plurality of rows of numerals arranged longitudinally thereof and representing the days of the months of the year, the names of the months being disposed at the head of the rows of numbers, the plate having a plurality of spaced slots therein disposed between said rows of numbers, a day dial slidably mounted in rear of the face dial having a transverse slot formed therein adapted to appear in rear of the spaced slots, a plurality of spaced rows of numerals formed on the day dial on opposite sides of the transverse slot, representing the days of the month of a year, and a month dial including a plurality of rows of numerals representing the months of a year, and a diagonal row of spots representing years arranged in the rows and disposed in diagonal alignment transversely across the dial, said numerals and spots representing the months and years adapted to be seen in rear of the mentioned slots.

7. A time calculator comprising a face dial having a plurality of longitudinally extending rows of numerals representing the days of the months of the year, the names of the months being arranged at the head of each row of numerals, the face dial having relatively broad slots formed therein between the rows of numerals representing the months, the day dial having a transverse slot formed centrally therein arranged to appear in rear of the mentioned slots, a plurality of rows of numerals formed on the day dial on each side of the slot, each row including a pair of columns of figures colored in different tones, the pairs of columns of numerals being adapted to appear between the rows of numerals formed on the face dial, and a month dial having a plurality of rows of numerals representing the months of the year arranged in rear of the slot formed on the day dial.

8. In a time computing device, a frame including a plate, means for supporting the plate in an upright position, arcuate guide flanges formed on the longitudinal edges of the plate, the plate having a sight opening therein, a face dial disposed in rear of the sight opening and having slots formed therein, and numerals representing the days and months of a year, a day dial having numerals therein representing the days of the month having arcuate side flanges formed thereon and slidably mounted within the guard flanges formed on the face plate, a day dial having numerals thereon representing the months of the year, arcuate guide flanges formed on the longitudinal edges of the month dial, the flanges being disposed in the guide flanges of the day dial, and means for actuating the day dial.

MATTHEW C. OSTER.